United States Patent
Miyamoto et al.

[11] Patent Number: 5,950,034
[45] Date of Patent: *Sep. 7, 1999

[54] CAMERA WITH A RETRACTABLE PHOTOGRAPHIC LENS AND COMPACT BATTERY COMPARTMENT CONSTRUCTION

[75] Inventors: Hidenori Miyamoto, Urayasu; Isao Soshi, Tokyo, both of Japan

[73] Assignee: Nikon Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/701,235

[22] Filed: Aug. 23, 1996

Related U.S. Application Data

[63] Continuation of application No. 08/186,602, Jan. 26, 1994, abandoned.

[30] Foreign Application Priority Data

Jan. 26, 1993 [JP] Japan ..................................... 5-010896

[51] Int. Cl.$^6$ ................................................. G03B 17/02
[52] U.S. Cl. ......................... 396/539; 396/542; 396/543
[58] Field of Search ..................................... 396/348, 349, 396/539, 542, 543

[56] References Cited

U.S. PATENT DOCUMENTS

| | | | |
|---|---|---|---|
| 4,419,000 | 12/1983 | Yoshida et al. | 354/173.1 |
| 4,544,251 | 10/1985 | Haraguchi et al. | 354/288 |
| 4,549,800 | 10/1985 | Maeda | 354/288 X |
| 4,710,008 | 12/1987 | Tosaka et al. | 354/486 X |
| 4,926,207 | 5/1990 | Eguchi et al. | 354/485 X |
| 5,001,505 | 3/1991 | Tosaka et al. | 354/288 X |
| 5,099,263 | 3/1992 | Matsumoto et al. | 354/195.12 |
| 5,218,390 | 6/1993 | Swayze | 354/288 X |

FOREIGN PATENT DOCUMENTS 3-219227  9/1991  Japan .

*Primary Examiner*—Safet Metjahic
*Assistant Examiner*—J. K. Han

[57] ABSTRACT

A camera having a retractable lens barrel which can be fully received in the camera body when the camera is not in use, such that the portion of the lens barrel closest to the back of the camera, i.e., nearest the image plane, stops forward of the portion of the electric supply battery extending furthest from the side wall of the camera body to which the electric supply battery is adjacent. As a result, the height of the camera can be made smaller. Moreover, a mounting board, with a release switch formed thereon and activated by a release button operated by a user, is located above a motor which drives the lens barrel, such that the load on the mounting board, during the activation of the release switch by pressure of the release button, is supported by the motor, so that it is not necessary to dispose a separate support member in the camera body, and the size of the camera can be made smaller.

7 Claims, 7 Drawing Sheets

CAMERA WITH A RETRACTABLE PHOTOGRAPHIC LENS AND COMPACT BATTERY COMPARTMENT CONSTRUCTION

This application is a continuation of application Ser. No. 08/186,602, filed Jan. 26, 1994, now abandoned.

BACKGROUND OF THE INVENTION

1. Field of the Invention

The present invention relates to a camera having a retractable photographic lens. In particular, the present invention relates to a camera wherein the photographic lens can be received within the camera body when the camera is not in use, and can extend outside the camera body in order to shoot a photograph, wherein a battery compartment is located in the camera body to minimize the size of the camera body.

2. Description of the Related Art

Cameras have heretofore been known with flash devices and auto focus devices built in, a lens barrel being movable, back and forth, relative to the camera body. In this kind of camera, the electric supply battery extends in the camera body parallel to the main capacitor for the flash device light generation at the side surface of the camera body and the supply battery is either in front of or behind the main capacitor.

In this type of prior art camera, it is possible to select a main capacitor, as required, of various diameters, according to a given volume of space allotted for the main capacitor, but because the dimensions of the electric supply battery are fixed (there being no freedom in the external form of the electric supply battery), the space required to hold the electric supply battery in the camera body becomes a serious obstacle to making the camera smaller.

SUMMARY OF THE INVENTION

Accordingly, it is an object of the present invention to solve the above-mentioned problems.

It is another object of the present invention to design a smaller form of camera, such that the electric supply battery, having predetermined dimensions, is located in an efficient position within the camera.

It is yet another object of the present invention to provide support to a mounting board in a camera having a release switch formed thereon, during activation of a release switch by a release button operated by a user, by using a motor which moves a lens barrel of the camera. As a result, a separate support member is not required, thereby minimizing the dimensions of the camera.

Additional objects and advantages of the invention will be set forth in part in the description which follows, and in part, will be obvious from the description, or may be learned by practice of the invention.

The foregoing and other objects of the present invention are achieved by a camera which includes a camera body, an electric supply battery compartment, able to receive an electric supply battery, located in a lower portion of the camera body, adjacent to a bottom wall of the camera body and having a dimension parallel to the film forwarding direction, such that the electric supply battery, seated in the compartment, has an axis parallel to the film forwarding direction and extends a maximum predetermined distance from the bottom wall. A lens barrel is movable between a position projecting from the camera body and a position received in the camera body and drive means moves the lens barrel between the position projecting from the camera body and the position received in the camera body. When the lens barrel is received and fully within the camera body, the rear portion of the lens barrel is further forward in the camera body than the portion of the electric supply battery extending furthest from the bottom wall of the camera, the maximum predetermined distance in a direction perpendicular to both the film forwarding direction and the optical axis.

Moreover, another camera according the present invention includes a camera body, a lens barrel movable between a position projecting from the camera body and a position received in the camera body, drive means for moving the lens barrel between the position projecting from the camera body and the position received in the camera body, a release operating member, operated when shooting a photograph, and projecting from the camera body, and a mounting board having a land portion mounted on the surface thereto, the land portion releasing a switch to take the photograph via the release operating member. In addition, the drive means, the bottom side of the aforementioned mounting board, and also the aforementioned land portion for release switch use, are adjacently located to one another.

By means of the present invention, when the lens barrel is fully received in the camera body, because the lens barrel is stopped at the top foreground of the electric supply battery compartment, nearer to the front of the camera than the portion of the electric supply battery extending the maximum predetermined distance from the bottom wall of the camera body, the height of the camera can be kept low.

Moreover, the mounting board is located above a motor which moves the lens barrel, wherein during release action of the release operating member, the load on the mounting board is supported by the motor, and a separate support structure in the camera body is not necessary, so that a camera of reduced size is obtained.

BRIEF DESCRIPTION OF THE DRAWINGS

These and other objects and advantages of the invention will become apparent and more readily appreciated from the following description of the preferred embodiments taken in conjunction with the accompanying drawings which:

FIG. 5 is a flow chart illustrating the action of the camera when the electric supply switch of the camera has been set ON.

DESCRIPTION OF THE PREFERRED EMBODIMENTS

Reference will now be made in detail to the present preferred embodiments of the present invention, examples of which are illustrated in the accompanying drawings, wherein like references refer to like elements throughout.

FIGS. 1–4 are various views showing a preferred embodiment of a camera according to the present invention.

Figure 1:
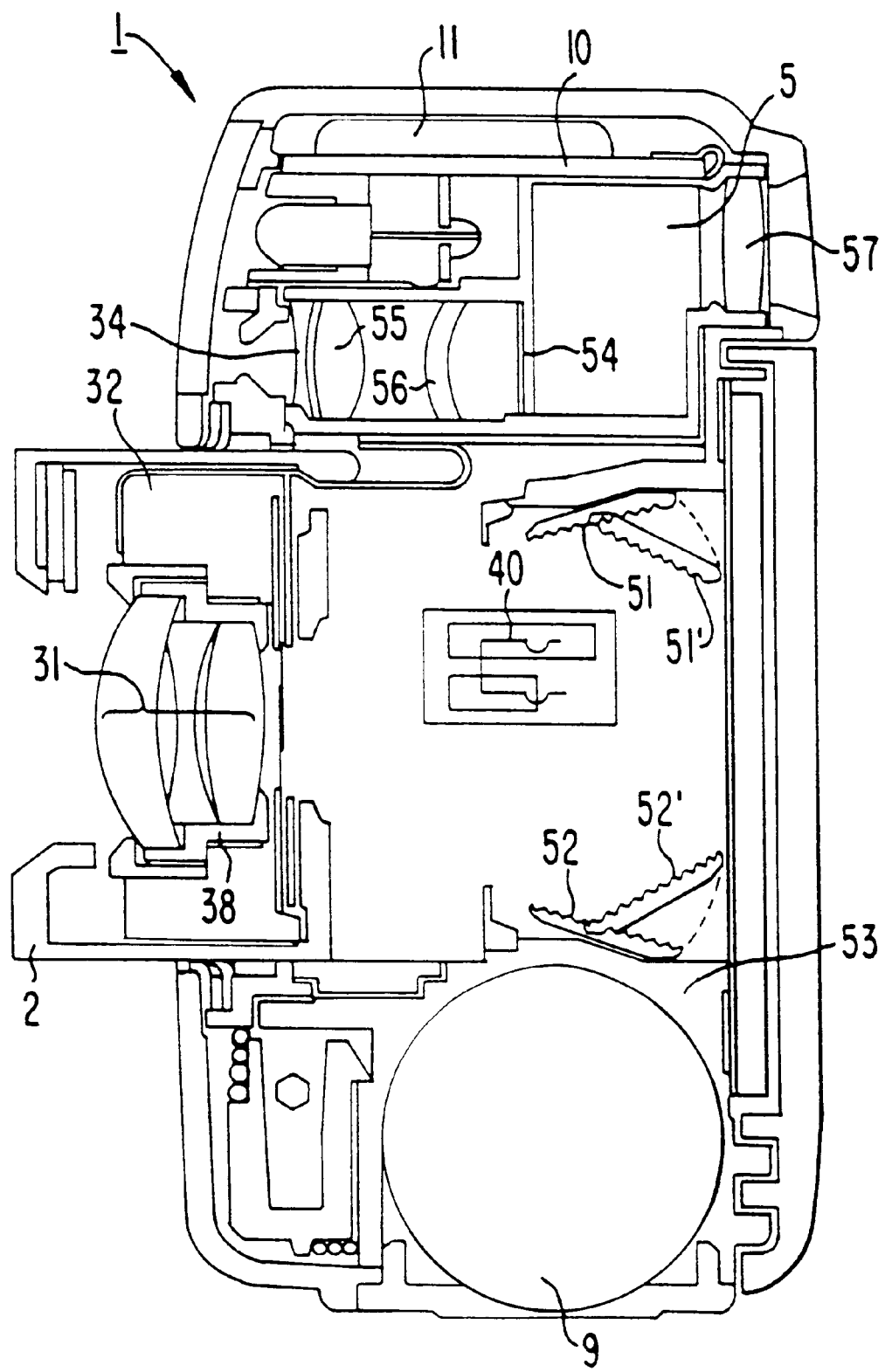
FIG. 1 is a central cross-sectional side view of a preferred embodiment of a camera according to the invention, showing the lens barrel in the state of projecting from the camera body.
Figure 2:
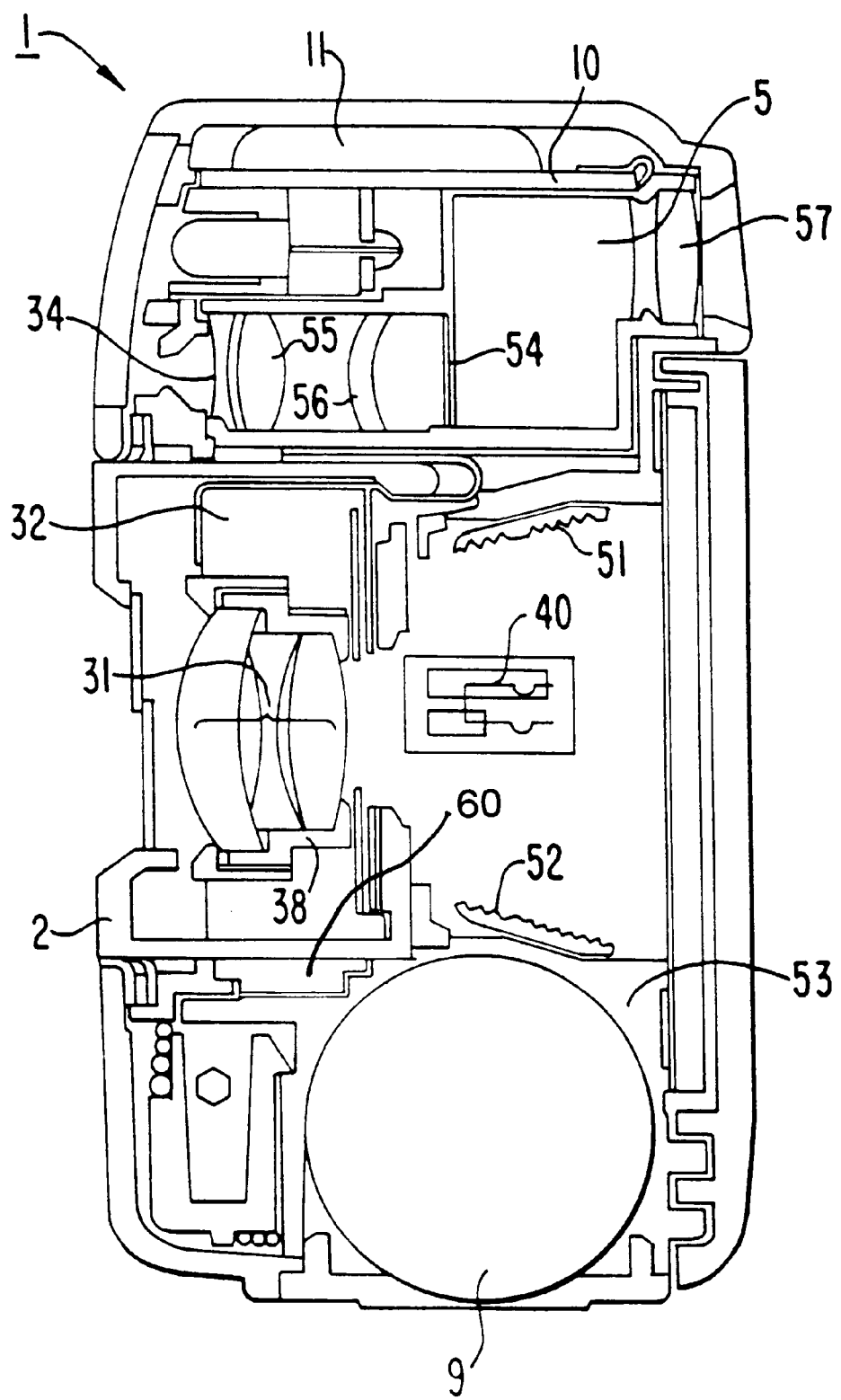
FIG. 2 is a central cross-sectional side view of the preferred embodiment of the camera according to the invention, showing the lens barrel in the state received in the camera body.

In the camera illustrated in FIGS. 1 and 2, a lens barrel 2 having a photographic lens 31, comprising a group or assembly of lenses, is located in about the central portion of a camera body 1, and is movable in the direction of the optical axis of the photographic lenses. Moreover, a viewfinder optical system, as further described below, is located at the upper portion of the lens barrel located within the camera body 1, and an electric supply battery compartment 53 for receiving an electric power supply battery, such as an elongated or cylindrical battery 9, is disposed at the lower portion (bottom portion) of the lens barrel. Moreover, a mounting board 10 is located at the uppermost portion of the camera body, 1 and on it is mounted a microcomputer (CPU) 11 to perform control of the action of various parts of the camera.

Photographic image frames 51 and 52 are located in the rear portion (film surface side) of the lens barrel 2, changeable from full size to panorama size or from panorama size to full size. The photographic image frames 51 and 52 are changed over by a changeover switch, not shown in the drawing, and move to positions 51' and 52' (FIG. 1) for panoramic photography.

The above-mentioned photographic lens 31 is received in a lens compartment 38 fixed to a shutter mechanism 32 constituting a drive portion of a combined stop and shutter. The shutter mechanism 32 is supported by the lens barrel 2. A support member 60 supports the lens barrel 2. The electric supply battery compartment 53 is structured to be able to receive the electric supply battery, embodied herein as cylindrical battery 9, and has its length direction in a direction parallel to the length direction of the camera (i.e., the direction from left and right sides of the camera which is shown in FIGS. 1 and 2 as the direction extending out of the plane of the drawings), such that the axis of the electric supply battery is also parallel to the length direction of the camera (the film forwarding direction), the rear end of the lens barrel 2 being constituted such as to stop further forward in the camera than the top portion of the battery farthest from the bottom wall of the camera body 1. A sum of the thicknesses of the lens barrel and the battery in the direction of the optical axis is greater than the thickness of the camera body in the optical axis direction. Further, the rear end of the lens barrel 2 is further to the rear of the camera body 1 than the portion of the battery closest to the front of the camera body 1, when the lens barrel is fully retracted within the camera body 1.

When the lens barrel 1 is fully retracted within the camera body 1, the bottom rear portion of the lens barrel 1 is in a space surrounded by a portion of the external circumference of the battery 9, a first plane surface tangential to a first portion of the battery 9 nearest a subject of the camera body 1, and a second plane surface tangential to the top portion of the battery 9 farthest from the bottom wall of the camera body 1.

A switch 40 includes a movable brush coupled to the lens barrel 2 and a pattern fixed on the camera body 1. When the lens barrel 2 is shifted by the lens barrel motor 20 (FIG. 3), CPU 11 monitors the shift quantity based on pulse signals. Switch 40 decides on a position that indicates a pulse count starting position (as in the case of FIG. 1).

Moreover, the above-mentioned viewfinder optical system comprises an objective lens group 34, 55, 56, an eyepiece lens 57, an image reversal prism 5, and primary imaging surface 54 of a real image type viewfinder.

FIG. 1 shows the state of the camera in which the lens barrel is extended from the camera body 1. FIG. 2 shows the state of the camera in which the lens barrel of FIG. 1 is retracted within the camera body 1. It can be seen in FIG. 2 that, when received within camera body 1, the rear portion of the lens barrel is located more to the forward side (front wall) of the camera than is the portion of the electric supply battery 9 which extends furthest from the bottom wall of the camera, the bottom wall being adjacent to the electric supply battery 9.

Figure 3:
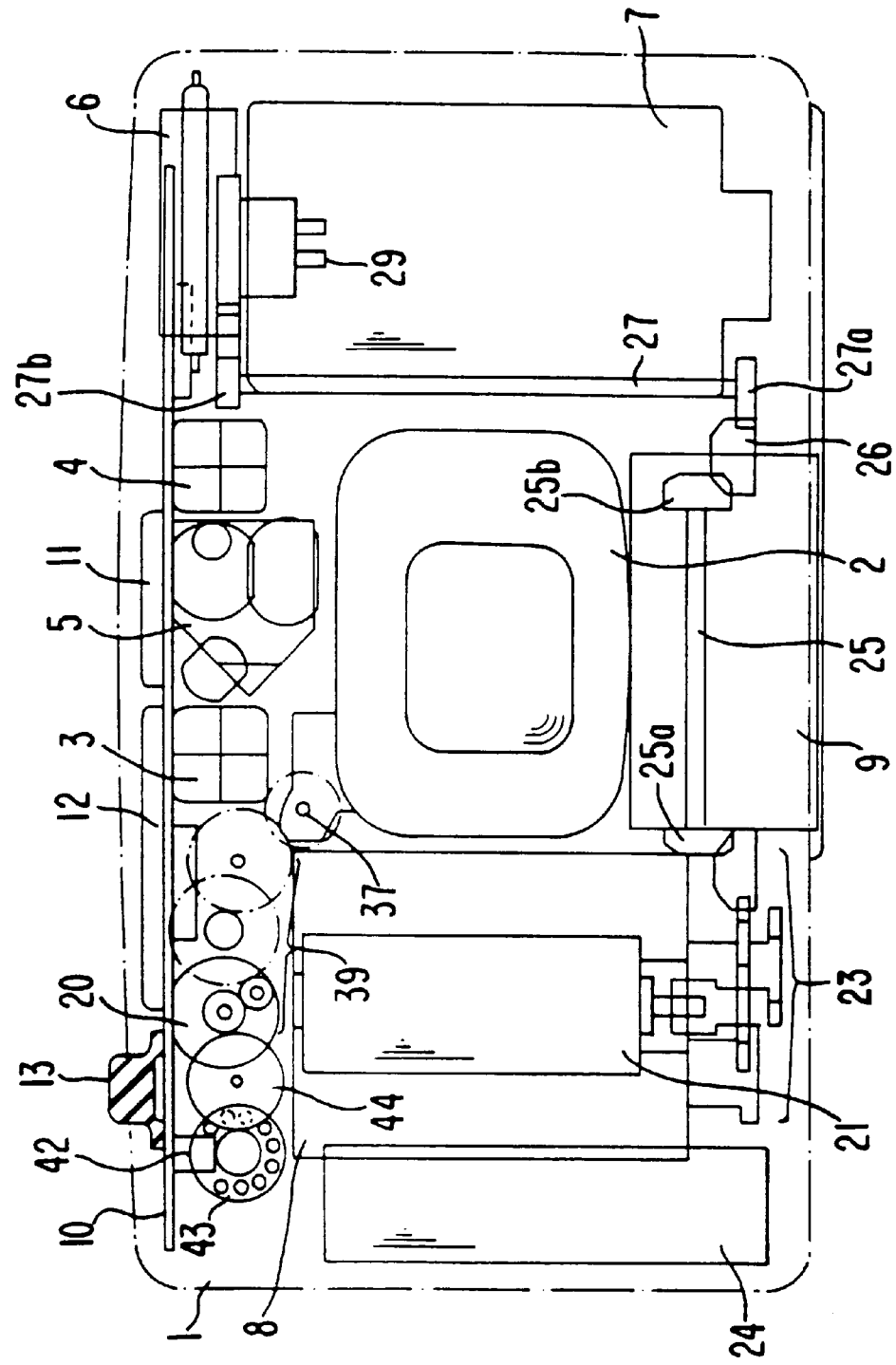
FIG. 3 is an elevational front view of the preferred embodiment of the camera according to the invention with the front cover removed.
Figure 4:
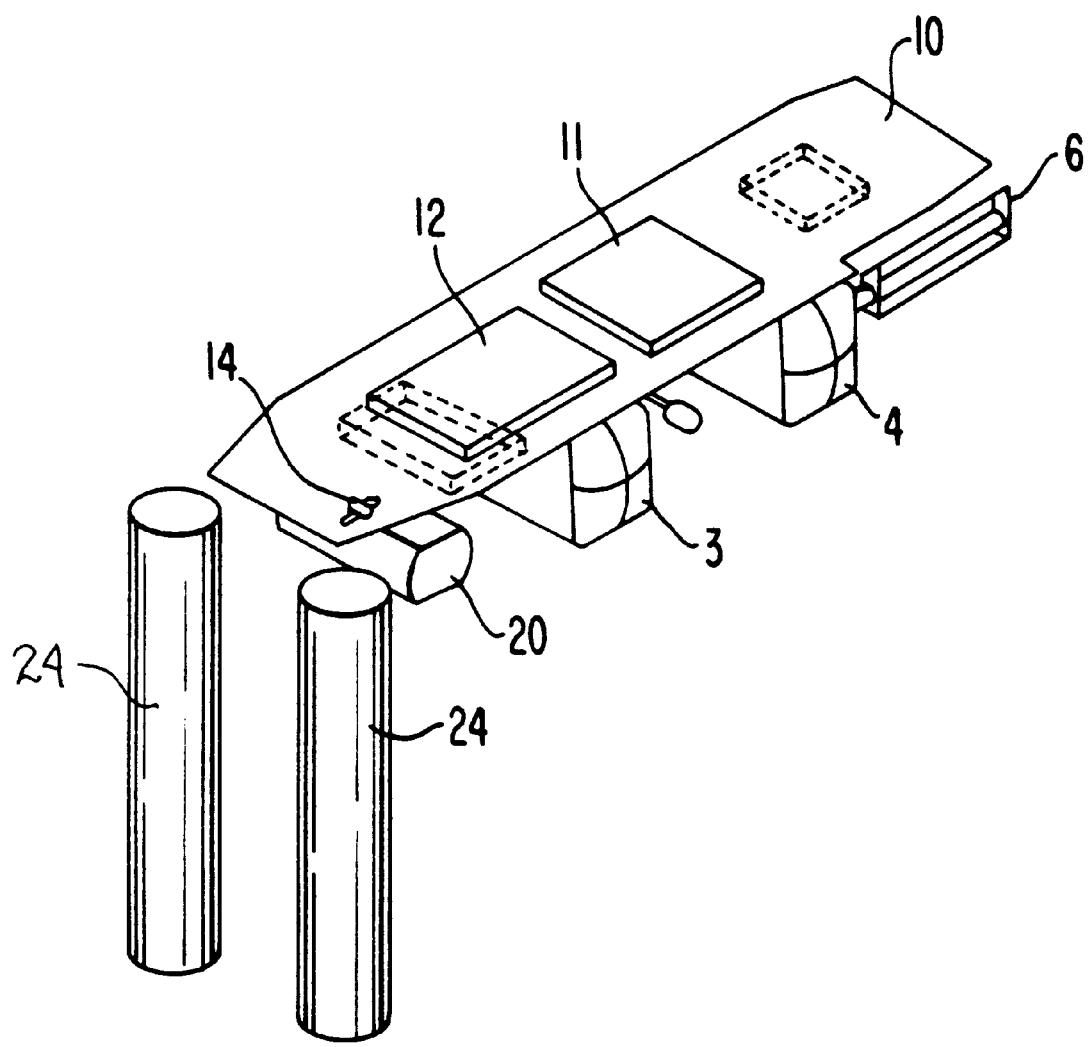
FIG. 4 is an oblique view showing the constitution adjacent to the mounting board in the camera of FIG. 3.

FIG. 3 shows a front elevational view of the camera with the front cover removed, wherein there is provided a film cartridge compartment 7 loaded with a film cartridge, and a film windup spool compartment 8 to wind up the film delivered from this film cartridge 7. The lens barrel 2 is located between this film cartridge compartment 7 and film windup spool compartment 8, and the electric supply battery 9 is located downward of the lens barrel 2.

An electric motor 21 is located within the windup shaft in the spool compartment 8 in order to perform forward winding of the film between the cartridge and the spool. The motor 21 comprises a motor drive device, and rotational drive of the electric motor 21 is transmitted at the time of rewinding of the film by means of a clutch mechanism 23, via transmission shafts 25–27 having bevel gears 25a, 25b, 27a and 27b at both ends, to a rewinding fork 29.

A capacitor 24 stores energy so that a flash unit 6 generates light. The capacitor 24 is located parallel to the film forwarding motor 21 in a side portion of the camera body. As shown in this embodiment, more than one capacitor 24 is provided. Moreover, a mounting board 10, which is a rigid board, is located along the inner wall surface at the upper portion of the camera body 1. On the upper side of the mounting board 10, there is installed a CPU 11, as a control circuit to perform control of the actions or operation of various parts of the camera, and an LCD 12, as a display panel to display various information, including the photographic mode setting or the action control state of various parts of the camera, the number of photographs and the like. Moreover, appropriate electronic components (not shown in FIG. 3), aside from the above-mentioned CPU 11 and LCD 12, are mounted on this mounting board 10, and in addition, electrical circuits are formed to respectively selectively connect the electronic components for operation of the camera. Details are mentioned hereinafter.

Lens barrel drive motor 20 is located on the lower side of the mounting board 10, and the drive force of lens barrel drive motor 20 is transmitted to move the lens barrel 2 via a speed reduction gear train 39 and a transmission screw 37. As a result, the lens barrel 2 is moved between the position projecting from the camera body and the aforementioned position received within the camera body. The amount of movement of the lens barrel 2 is detected by an encoder comprising a code plate 43 and a photointerruptor 42 rotated by a gear 44 by means of the lens barrel drive motor 20. The CPU 11 counts the pulse signals from the encoder, and sets an encoder switch 40 (FIGS. 1 and 2) ON when a predetermined value of the pulse count is reached.

The constitution of the above-mentioned mounting board 10 will be described below with particular reference to FIG.

4, as well as FIG. 3. A land portion 14, being of conductive material, is formed on the mounting board 10 for release switch use through downward pressure of a release button 13 which is disposed projecting from the upper end of the camera body 1. Moreover, the CPU 11 and LCD 12 are located on the mounting board 10. Besides land portion 14, land portions not shown in the drawing, being of conductive material for use as input switches, are disposed on the mounting board 10 and correspond to various operations of the camera.

Figure 7:
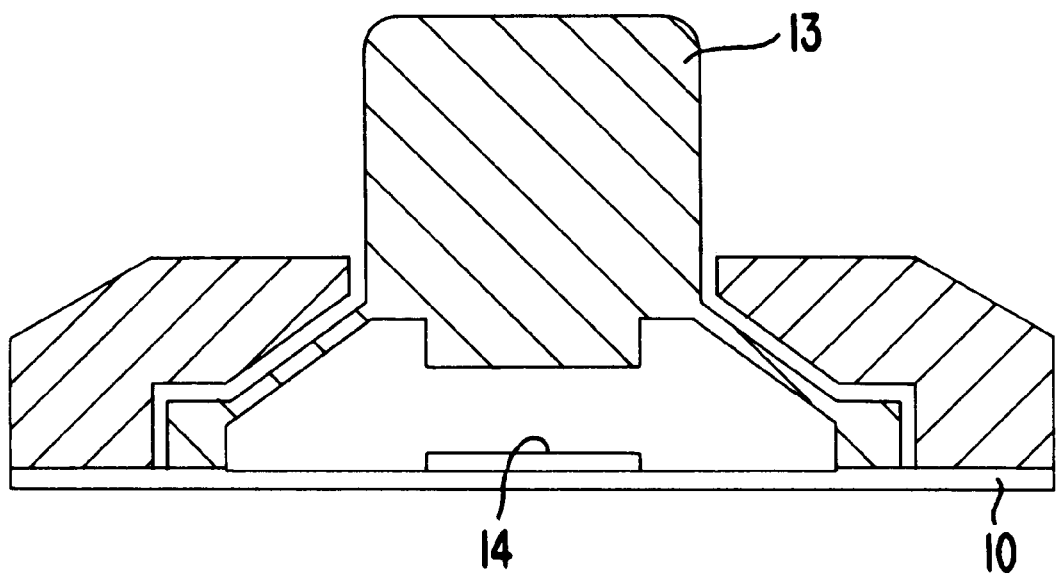
FIG. 7 is a cross-sectional view of a release button, conductive land portion and mounting board of FIGS. 3 and 4 shown in detail.
Figure 8:
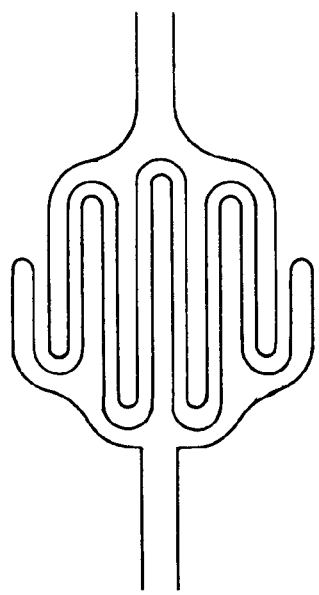
FIG. 8 is a plan view of the conductive land portion shown in FIG. 4.

FIG. 7 shows a cross-sectional view of a release switch operating member (release button) 13 located on the mounting board 10. The release button 13 is made of rubber and by pressing the release button 13, the leg portions bend and the bottom of the release button 13 comes into contact with the conductive land portion 14, so that the release switch is ON. The conductive land portion 14 is in fact a pattern of conductors as shown in FIG. 8, so that these conductive portions are started by coming into contact with the bottom portion of the release button 13.

The lens barrel drive motor 20, for driving the lens barrel 2, is fixed to a portion of the camera body 1. Moreover, the lens barrel drive motor 20 is located such that it faces the side (lower side) of the mounting board 10 opposite to the side (upper side) at which the release button is located, and prevents the mounting board 10 from being bent more than necessary when the release button 13 is operated.

Moreover, on the lower side of the mounting board 10, between it and the lens barrel 2, there are disposed a light receiving block 3 and a light projection block 4 comprising an auto focus device, a strobe light generation unit 6. On the lower side of mounting board 10 there is also an automatic exposure control (AE) device and the like (not shown in FIG. 4), and the flash light generation capacitor 24 is disposed at the side thereof.

Figure 5:
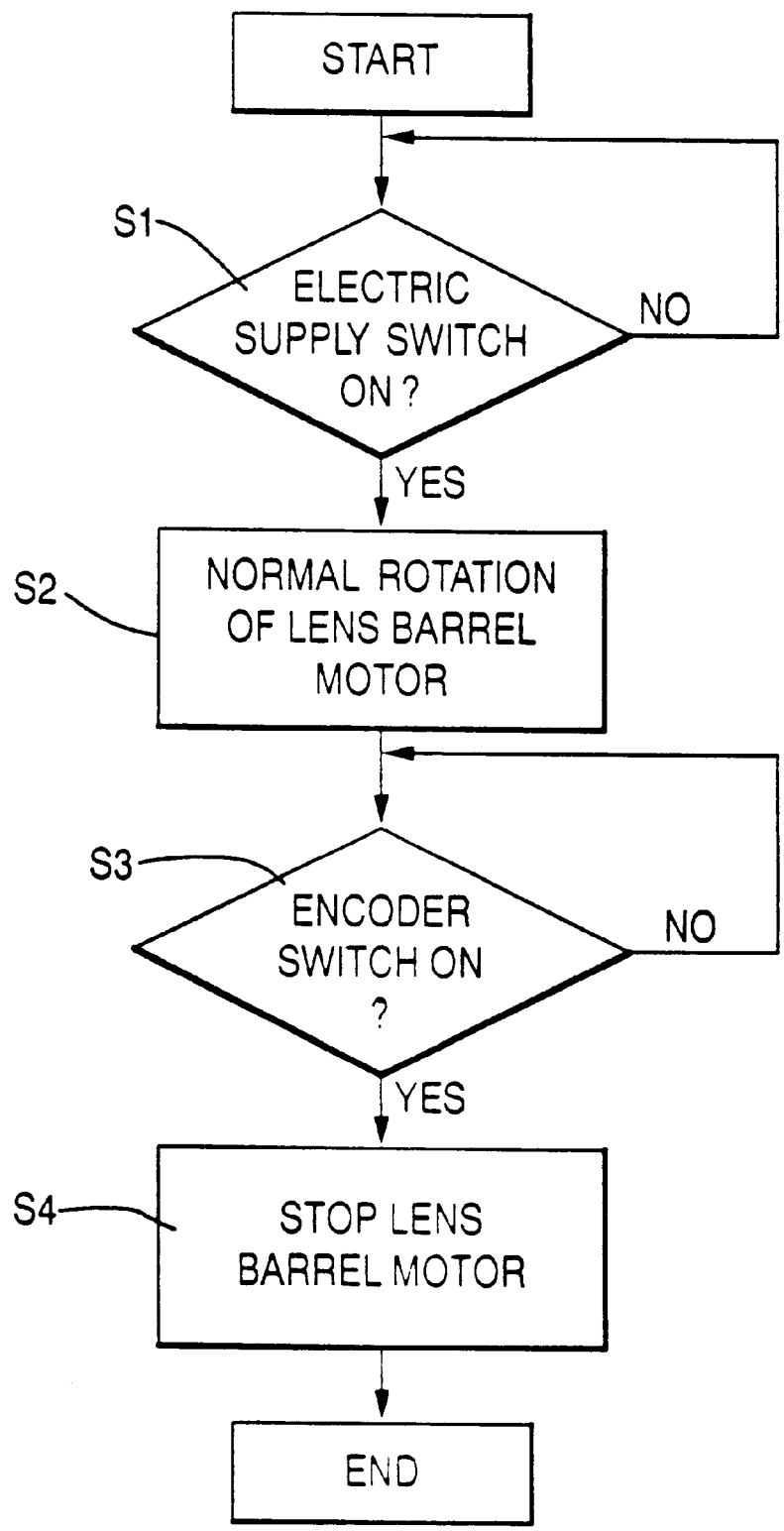

The actual action of the camera of this embodiment will be described hereinbelow with reference to the flow charts of FIGS. 5 and 6. FIG. 5 is a flow chart to illustrate the action of the camera when the electric supply switch of the camera has been set ON. In step S1, the output signal from the electric supply switch is input and if the electric supply switch is detected to be ON, the program proceeds to step S2. In step S2, a normal rotation signal is output to the lens barrel drive motor 20, and the program proceeds to step S3. In step S3, the output signals of the encoder switch 40 are input, and the encoder switch is detected to be ON, and then the program proceeds to step S4. In step S4, outputting a stop signal to the lens barrel drive motor 20 ends the procedure.

Figure 6:
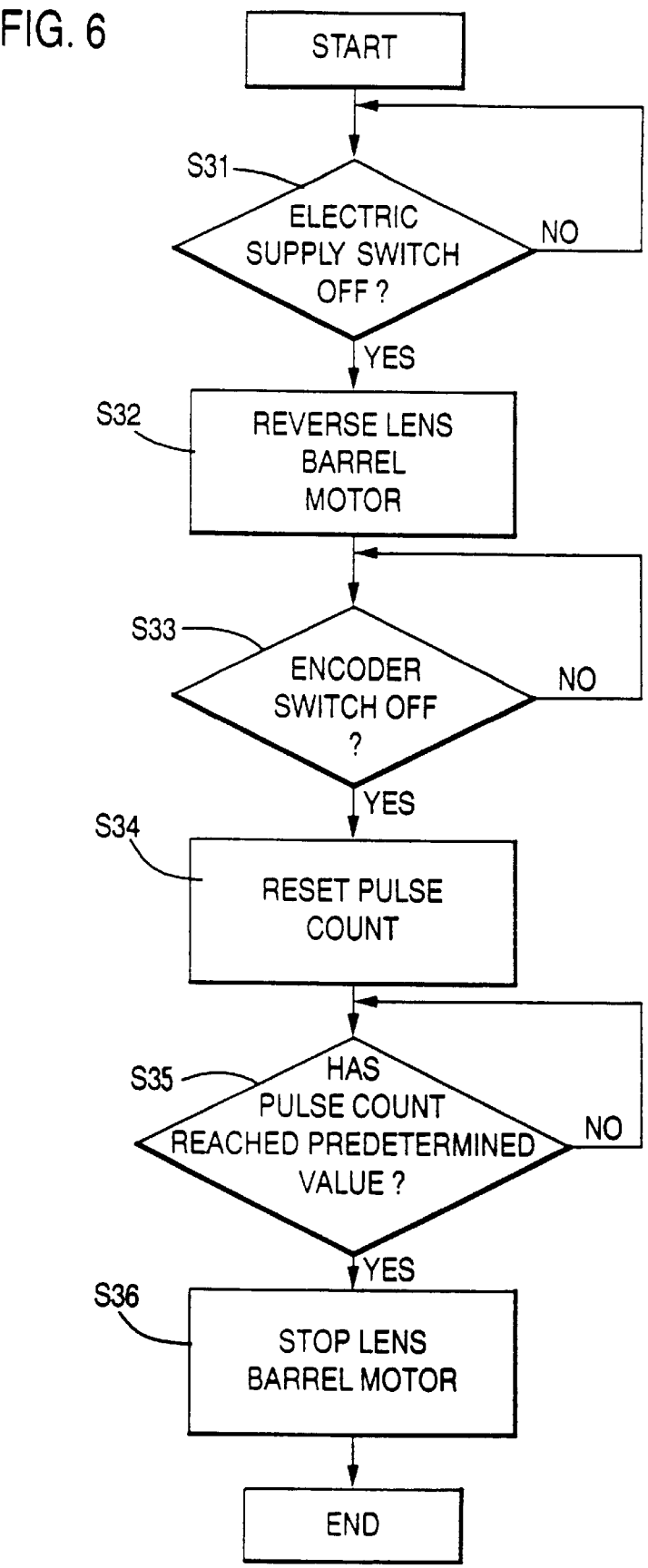
FIG. 6 is a flow chart illustrating the action of the camera when the electric supply switch of the camera has been set OFF.

FIG. 6 is a flow chart to illustrate the action of the camera when the electric supply switch has been set OFF. In step S31, an output signal from the electrical supply switch is input, and when it is detected that the electric supply switch has become OFF, the program proceeds to step S32. In step S32, when an output signal is output to the lens barrel drive motor 20, the motor is reversed and the program proceeds to step S33. In step S33, an output signal is input from the encoder switch, and when it is detected that the encoder switch has been set OFF, the program proceeds to step S34. In step S34, the pulse count of the encoder is reset, and the program proceeds to step S35. In step S35, signals output from the encoder are input, and when the pulse count reaches a predetermined value, the program proceeds to step S36. In step S36, an output signal is output to the lens barrel drive motor 20, the motor is stopped and the procedure is ended.

In accordance with the present invention, when the lens barrel 2 is collapsed (retracted within the camera body 1), because the portion of lens barrel 2 closest to the image plane of the camera (the back of the camera) is stopped further forward in the camera than the portion of the electric supply battery extending furthest from the bottom wall of the camera to which the electric supply battery is adjacent, it is possible to make the camera height low by not requiring the height of the top of electric supply battery to be below the height of the bottom of the lens barrel.

Moreover, because the electric supply battery compartment is located as far rearward as possible, space is made between the front cover and the front wall of the battery compartment, and by locating the film rewind drive or transmission shaft in this portion, a camera of smaller size can be designed.

Furthermore, in addition to making the size of the camera smaller, because bending of the mounting board when operating the release button can be suppressed without using a further support member, the mounting board can be maintained in its initial state even when utilized for a long period of time, and inaction or faulty action of the release switch, which occurs due to the bending of the mounting board, can be prevented.

Although a preferred embodiment of the invention has been shown and described, it will be appreciated by those skilled in the art, that many changes may be made in this embodiment, without departing from the principles and spirit of the present invention, the scope of which is defined in the claims and their equivalents.

What is claimed is:

1. A camera comprising:

(a) a camera body with front, back, top and bottom walls;

(b) an elongated battery compartment for receiving an elongated electric supply battery located adjacent to the camera bottom wall and having a length extending in a first direction parallel to a film running direction in the camera, the battery being seated in said battery compartment wherein the battery has a top portion parallel to the first direction and which is furthest from the camera bottom wall, the lengthwise axis of the battery being parallel to the film winding direction;

(c) a lens barrel movable between a first position extending from and substantially perpendicular to the camera front wall and a second position retracted within the camera body, wherein when said lens barrel is at said second position, a rear surface of the lens barrel, nearest to the camera back wall, is closer to the camera front wall than the top portion of the battery;

(d) drive means for moving said lens barrel between said first and second positions;

(e) a release operating member, extending from the top wall of the camera, depressed by a user in order to shoot a photograph; and (f) a mounting board, having a top surface facing the camera top wall and a bottom surface facing the camera bottom wall and located adjacent to the camera top wall, with a conductive land portion being a release switch turned ON and OFF by connection with said release operating member and formed on the top surface;

said drive means, located adjacent to the bottom surface, supporting the mounting board during contact between said release operating member and said land portion.

2. A camera comprising:

(a) a camera body having front, back, top and bottom walls;

(b) a lens barrel movable between a first position extending from and perpendicular to the front wall and a second position fully retracted within the camera body;

(c) a release operating member, extending from the top wall of the camera body, depressed by a user in order to shoot a photograph;

(d) a mounting board, having a top surface facing the top wall and a bottom surface facing the bottom wall and located adjacent to the top wall, with a conductive land portion being a release switch turned ON and OFF by connection with said release operating member and formed on the top surface; and (e) drive means, located adjacent to the board bottom surface, for moving said lens barrel between said first and second positions, and supporting the mounting board during contact between said release operating member and said land portion.

3. A camera comprising:

(a) a camera body having front, back top, and bottom walls;

(b) an electric supply battery compartment located in a lower portion of the camera body and having a lengthwise direction substantially parallel to a film running direction in the camera body;

(c) a lens barrel movable between a first position projecting from the camera body and a second position received in the camera body, and when received the lens barrel has a rear portion located forward of the top portion of the battery compartment;

(d) drive means for moving the lens barrel between the first position and second positions;

(e) a release operating member, extending from the top wall of the camera, depressed by a user in order to shoot a photograph; and (f) a mounting board, having a top surface facing the camera top wall and a bottom surface facing the camera bottom wall and located adjacent to the camera top wall, with a conductive land portion being a release switch turned ON and OFF by connection with said release operating member and formed on the top surface;

said drive means, located adjacent to the board bottom surface, supporting the mounting board during contact between said release operating member and said land portion.

4. The camera as claimed in claim 3, further comprising:

said battery compartment having a compartment wall facing and spaced apart from the camera front wall;

a film cartridge compartment having a rewind fork, for holding a film cartridge;

a film windup spool for receiving film from the film cartridge;

a motor for driving the film windup spool; and a rewind drive shaft, connected to said motor and said rewind fork and located between the camera front wall and the compartment wall, for transferring rotational force of said motor to the rewind fork, to rewind the film.

5. A camera having a camera body, comprising:

a lens barrel which supports a lens and a shutter used as an aperture, said lens barrel being movable in an optical axis direction of said lens and collapsible within the camera body; and a cylindrical-shaped device which stores electrical energy and having a central axis in a plane substantially perpendicular to the optical axis of said lens;

wherein when said lens barrel collapses within the camera body, said shutter is positioned at a subject side of the central axis of said electrical energy device and a total thickness of the camera body in the optical axis direction is less than a total thickness of said lens barrel and said electrical energy storage device.

6. A camera having a camera body, comprising:

a lens barrel which supports a lens and a shutter used as an aperture, said lens barrel being movable in an optical axis direction of said lens and collapsible within the camera body; and a cylindrical-shaped device which stores electrical energy and having a central axis in a plane substantially perpendicular to the optical axis of said lens;

wherein when said lens barrel collapses within the camera body, a portion of said lens barrel overlaps with said electrical energy storage device in the optical axis direction.

7. A camera having a camera body, comprising:

a lens barrel which supports a lens and a shutter used as an aperture, said lens barrel being movable in an optical axis direction of said lens and collapsible within the camera body;

a cylindrical-shaped device which stores electrical energy and having a central axis in a plane substantially perpendicular to the optical axis of said lens; and a support member to support said lens barrel;

wherein a portion of said support member is arranged in a space surrounded by an external circumference of said electrical energy storage device, a first plane surface tangential to a first portion of said electrical energy storage device nearest a subject of the camera and a second plane surface tangential to a second portion of said electrical energy storage device farthest from a bottom wall of the camera body.

* * * * *